(12) United States Patent
Iijima

(10) Patent No.: US 7,072,008 B2
(45) Date of Patent: Jul. 4, 2006

(54) LIQUID CRYSTAL DISPLAY DEVICE, METHOD FOR MANUFACTURING THE SAME, AND ELECTRONIC APPARATUS

(75) Inventor: Chiyoaki Iijima, Ina (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 10/438,220

(22) Filed: May 15, 2003

(65) Prior Publication Data

US 2004/0090568 A1    May 13, 2004

(30) Foreign Application Priority Data

May 17, 2002   (JP)   ............................. 2002-143230
May 14, 2003   (JP)   ............................. 2003-135995

(51) Int. Cl.
  *G02F 1/13*   (2006.01)

(52) U.S. Cl. ....................................... 349/96
(58) Field of Classification Search ............... 349/96, 349/153
  See application file for complete search history.

(56) References Cited

U.S. PATENT DOCUMENTS 4,241,984 A * 12/1980 Leibowitz .................... 349/162
6,396,470 B1 * 5/2002 Zhang et al. .................. 345/87

FOREIGN PATENT DOCUMENTS

| JP | 58-023312 | 8/1956 |
| JP | 53-010448 | 1/1978 |
| JP | 53-020948 | 2/1978 |
| JP | 53-046049 | 4/1978 |
| JP | A-57-054925 | 4/1982 |
| JP | A-58-205181 | 11/1983 |
| JP | A-60-026303 | 2/1985 |
| JP | U-62-084021 | 5/1987 |
| JP | U-03-058630 | 6/1991 |
| JP | A-04-075025 | 3/1992 |
| JP | A-07-261169 | 10/1995 |
| JP | A-07-270782 | 10/1995 |
| JP | WO 97/39380 | 10/1997 |
| JP | A-2001-504238 | 3/2001 |
| JP | A-2001-305526 | 10/2001 |

\* cited by examiner

*Primary Examiner*—James A. Dudek
(74) *Attorney, Agent, or Firm*—Oliff & Berridge, PLC

(57) ABSTRACT

To provide a transflective liquid crystal display device which allows bright display even in a transmission mode and a method for manufacturing the same.

A liquid crystal display device of the present invention has a liquid crystal layer 4 interposed between an upper substrate 1 and a lower substrate 2 disposed opposite to each other, a pair of polarizing layers (a polarizing plate 17 and a polarizing layer 26) provided above and below the liquid crystal layer 4, and reflective layers 21 partially provided within respective dots. The polarizing layer 26 is formed above electrode layers 25 provided on the inner surface of the lower substrate 2 in order to apply voltage to the liquid crystal layer 4. The polarizing layer 26 is also formed further towards the inside than a sealing material 5.

10 Claims, 5 Drawing Sheets

A

B

C

LIQUID CRYSTAL DISPLAY DEVICE, METHOD FOR MANUFACTURING THE SAME, AND ELECTRONIC APPARATUS

BACKGROUND OF THE INVENTION

1. Field of Invention

The present invention relates to liquid crystal display devices and electronic apparatuses. More specifically, the invention relates to a liquid crystal display device having particularly excellent reliability and a method for manufacturing the same.

2. Description of Related Art

Recently, a liquid crystal display device has been proposed in which a polarizing layer is provided at the inner surface (liquid crystal display side) of a substrate constructing the liquid crystal display device. The provision of the polarizing layer at the inner surface of the substrate makes it unnecessary to provide a polarizing plate which has been conventionally adhered to the outside of a substrate. As a result, by using this technique manufacturing cost can be reduced and making a liquid crystal display device thin is feasible. Further, a transflective liquid crystal display device has advantages whereby the provision of the polarizing layer at the inner surface of the substrate makes it possible to reduce the absorption of light in the polarizing plate in a transmission mode and to improve display brightness.

SUMMARY OF THE INVENTION

However, in order to form the polarizing layer on the inner surface of the lower substrate in the liquid crystal display device according to the above construction, a water-soluble material is generally coated at the inner surface side of the substrate. It is possible that the polarizing layer formed by such a manufacturing method may be easily deteriorated by moisture contained in the ambient air. Thus, development of a liquid crystal display device in which the polarizing layer hardly deteriorates and thus having excellent reliability has been demanded.

The present invention has been conceived to solve the above problems. Accordingly, it is an object of the present invention to provide a liquid crystal display device having excellent reliability.

Further, it is another object of the present invention to provide a method for manufacturing a liquid crystal display device capable of manufacturing the above liquid crystal display device without remarkably increasing the number of processes.

Moreover, it is a further object of the present invention to provide an electronic apparatus having a liquid crystal display part having excellent reliability and bright display.

In order to solve the above problems, the present invention can provide a liquid crystal display device having a liquid crystal layer interposed between an upper substrate and a lower substrate disposed opposite to each other, and a pair of polarizing layers provided above and below the liquid crystal layer. One of the polarizing layers can be formed above electrode layers provided on the inner surface of the lower substrate, and the other polarizing layer on the lower substrate can be formed further towards the inside than the outer peripheral end of a sealing material for sealing the liquid crystal layer between the upper and lower substrates.

Water-soluble lyotropic liquid crystal can be used for a polarizing layer built between the upper and lower substrates. Thus, it is considered that the exposure of the polarizing layer in the ambient air containing moisture causes shortened lifetime of the polarizing layer and causes lowered reliability of the liquid crystal display device. Therefore, since the polarizing layer is isolated from the ambient air by a sealing material, the deterioration of the polarizing layer due to moisture in the ambient air can be prevented. Hence, it is possible to provide a liquid crystal display device having excellent reliability.

Further, the liquid crystal display device of the above construction is a liquid crystal display device in which a polarizing layer can be formed on the inner surface of the lower substrate. Meanwhile, the polarizing layer is formed above electrode layers which drive the liquid crystal layer, and thus it is possible to obtain bright display even in any of the reflection mode and transmission mode.

In a transflective liquid crystal display device having a polarizing layer built between upper and lower substrates, a method wherein a lyotropic liquid crystal solution as a water-soluble dichroic dye is coated on a substrate by applying pressure in a predetermined direction is utilized as a method for forming the polarizing layer.

In the above method, the lyotropic liquid crystal is aligned in a predetermined direction to control the transmission and absorption axes of a polarizing layer. Due to such an alignment, when any disorder occurs in the alignment of the lyotropic liquid crystal during or after the coating thereof, the transmissivity or absorptivity of the polarizing layer is undesirably deteriorated. In the conventional liquid crystal display device of such a kind, since a polarizing layer is formed on reflective layers where openings for transmissive display are provided, disorder in the alignment of lyotropic liquid crystal occurs in stepped portions between reflective layers and the openings. As a result of that, there is a problem in that the characteristic of the polarizing layer is deteriorated and the transmissivity of the liquid crystal display device is lowered.

In contrast, since the polarizing layer is formed over the electrode layers in the liquid crystal display device according to the present invention, the polarizing layer within the display region can be flattened. As a result, unlike the case where a polarizing layer is formed on reflective layers having openings, disorder can hardly occur in the alignment of the polarizing layer within the display region, and thereby the polarization characteristic cannot be deteriorated. Accordingly, it is possible to manufacture a liquid crystal display device that enables bright display along with transmissive display and reflective display, and has excellent display quality.

Moreover, in the liquid crystal display device according to the present invention, it is preferable that the polarizing layer on the lower substrate be formed further towards the inside than the inner peripheral end of a sealing material for sealing the liquid crystal layer between the upper and lower substrates.

According to the above construction, the adherence between a seal and a substrate increases, and the prevention of moisture from intruding into the ambient air can be improved.

Next, the liquid crystal display device according to the present invention can be also a transflective liquid crystal display device in which reflective layers partially formed in respective dots are provided on the lower substrate rather than the polarizing layer on the lower substrate. According to the above construction, since the upper polarizing layer does not allow the absorption of light to occur in a bright display of transmission mode, it is possible to provide a transflective liquid crystal display device having high display brightness.

Next, in the liquid crystal display device according to the present invention, it is preferable that an insulating film be formed on the polarizing layer. According to the above construction, the insulating film can be disposed between the electrode layers and the liquid crystal layer, so that an electrical contact between the electrode layers of the upper and lower substrates can be effectively prevented, and excellent reliability can be obtained. In other words, when conductive impurities exist in the liquid crystal layer, it is possible that the impurities pass through the alignment film on the electrode layers to reach the electrode layers, and the upper electrode layers and lower electrode layers electrically contact each other via the impurities. However, when an insulating film is provided above the electrode layers as in the present configuration, the insulating film can intercept the impurities, thereby enhancing the reliability of the liquid crystal display device.

In the liquid crystal display device according to the above present invention, it is preferable that the insulating film be made of a material mainly composed of $SiO_2$. Further, in the liquid crystal display device of the above construction, it is preferable that the film thickness of the insulating film be no less than 150 nm and no greater than 1500 nm.

In case that the insulating film is made of a material mainly composed of $SiO_2$, when the thickness of the insulating film is less than 150 nm, the insulation feature cannot be secured, whereas when the film thickness of the insulating film exceeds 1500 nm, the voltage applied to the liquid crystal layer may considerably drop to undesirably deteriorate optical characteristics such as contrast.

Next, in the liquid crystal display device according to the present invention, it is preferable that the insulating film be made of a light-transmitting resin material. For the resin materials capable of constructing the insulating film according to the present invention, acryl group resin, epoxy group resin, and the like can be used. Among these, acryl group resin is favorably used. Further, in the liquid crystal display device of the above construction, preferably the thickness of the insulating film is no less than 150 nm and no greater than 1000 nm.

If the insulating film is made of a material mainly composed of resin material, when the film thickness of the insulating film is less than 150 nmnm, the insulation feature cannot be secured. When the film thickness of the insulating film exceeds 1000 nm, the voltage applied to the liquid crystal layer may considerably drop to undesirably deteriorate optical characteristics, such as contrast.

Next, the liquid crystal display device according to the present invention can be constructed such that an alignment film is formed on the insulating film, and the thickness of insulating film is no less than 100 nm and no greater than 800 nm. When the film thickness of the alignment film is less than 100 nm, the initial alignment in the liquid crystal layer cannot be favorably controlled. When the film thickness of the insulating film exceeds 800 nm, the voltage applied to the liquid crystal layer may considerably drop to undesirably deteriorate optical characteristics, such as contrast.

Next, the liquid crystal display device according to the present invention can be constructed such that the outer peripheral end of the polarizing layer and the outer peripheral end of the insulating film are substantially at the same position as seen in plan view, and an alignment film covers the polarizing layer and the insulating film. According to the above construction, since the soluble polarizing layer having a relatively inferior durability can be covered with the alignment film up to its end, the deterioration of the polarizing layer can be effectively prevented, so that it is possible to provide a liquid crystal display device having excellent reliability.

Next, in order to solve the above problems, the present invention can provide a method for manufacturing a liquid crystal display device having a liquid crystal layer interposed between an upper substrate and a lower substrate disposed opposite to each other, and having a pair of polarizing layers provided above and below the liquid crystal layer. The method can include: forming a polarizing layer above reflective layers, partially forming an insulating film on the polarizing layer, and partially removing the polarizing layer by using the insulating film as a mask.

According to the above manufacturing method, it is possible to easily manufacture a liquid crystal display device in which a polarizing layer is formed on a reflective layer, and an insulating film is formed directly on the polarizing layer. The liquid crystal display device manufactured by such a method can include an insulating film on a polarizing layer, and a polarizing layer is formed substantially in the same shape as the insulating film as seen in plan view. Accordingly, the insulating film protects the upper surface side of the polarizing layer, so that the polarizing layer hardly deteriorates but has excellent reliability.

Further, since the selective arrangement of the polarizing layer is performed using the insulating film as a mask, it is possible to reduce the manufacturing cost by simplifying the processes.

Next, in the manufacturing method according to the present invention, it is preferable that the outer peripheral end of the polarizing layer be formed to be further towards the inside than the outer peripheral end of a sealing material for bonding the upper and lower substrates to each other. According to such a manufacturing method, the patterning is performed using the insulating film as a mask, so that it is possible to manufacture a liquid crystal display device in which a polarizing layer is disposed inside a sealing material and the polarizing layer is isolated from the ambient air with the sealing material.

Next, in the method for manufacturing a liquid crystal display device according to the present invention, it is preferable that an alignment film cover the polarizing layer and the insulating film. Since the end face of the polarizing layer is covered with the alignment film by the above construction, it is possible to manufacture a liquid crystal display device that can prevent the deterioration of the polarizing layer more effectively.

Next, in the method of manufacturing a liquid crystal display device according to the present invention, the polarizing layer can be also formed on the electrode layers formed on the reflective layer. According to such a manufacturing method, since the polarizing layer is also formed on electrode layers and an isolating film is formed on the polarizing layer. Thus, it is possible to easily manufacture a liquid crystal display device in which an electrical contact between electrode layers of the upper and lower substrates can be effectively prevented by the insulating film. Also, since the polarizing layer is formed on the electrode layers forming a flat surface within the display region, disorder in the alignment of liquid crystal constructing the polarizing layer within the display region hardly occurs. Hence, it is possible to provide a polarizing layer having an excellent polarization characteristic. Therefore, according to such a manufacturing method, it is possible to manufacture a liquid crystal display device having excellent display quality.

Next, an electronic apparatus according to the present invention can include a liquid crystal display device described in any one of the above descriptions. According to such a construction, it is possible to provide an electronic apparatus provided with a liquid crystal display part having bright display and excellent reliability.

BRIEF DESCRIPTION OF THE DRAWINGS

The invention will be described with reference to the accompanying drawings, wherein like numerals reference like elements, and wherein:

FIG. 1A is a cross-sectional view of the liquid crystal display device provided with a liquid crystal panel and a backlight, and FIG. 1B is a plan view of a lower substrate 2 (however, color filters, reflective layers and a flattening film are omitted).

FIG. 3A is a cross-sectional view of a liquid crystal device provided with a liquid crystal panel and a backlight, and FIG. 3B is a plan view of a lower substrate 2 (however, color filters, reflective layers and a flattening film are omitted).

DETAILED DESCRIPTION OF PREFERRED EMBODIMENTS

Hereinafter, preferred embodiments of the present invention will be explained with reference to the accompanying drawings.

Figure 1:
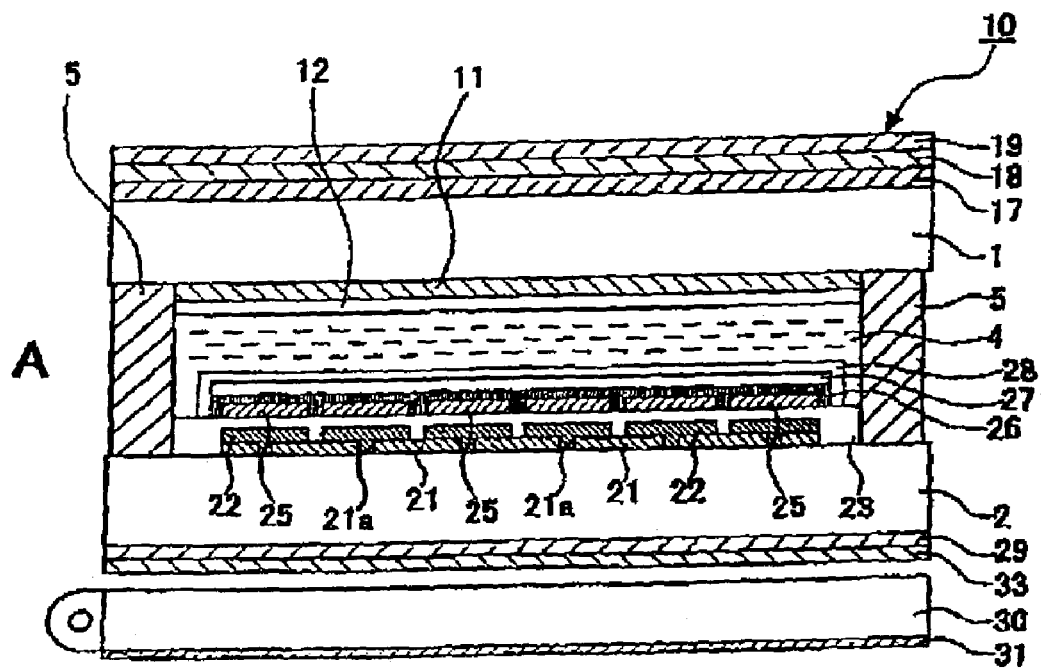
FIG. 1 is cross-sectional constructional views of a liquid crystal display device as an embodiment of a present invention.
Figure 1:
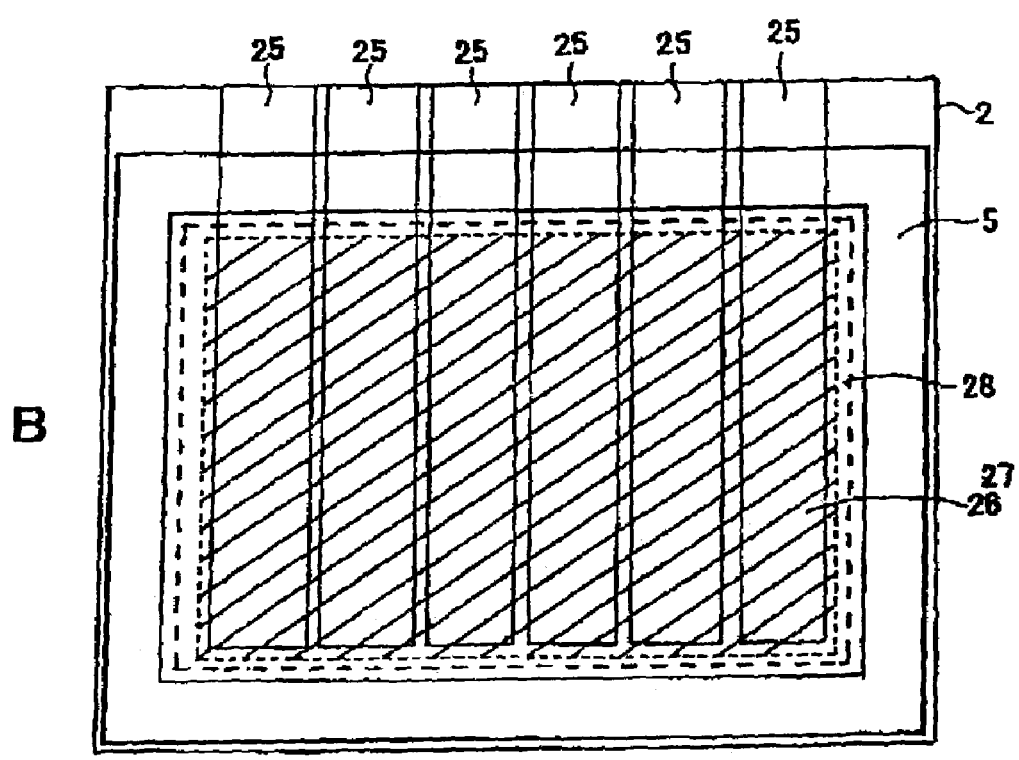
Figure 2:
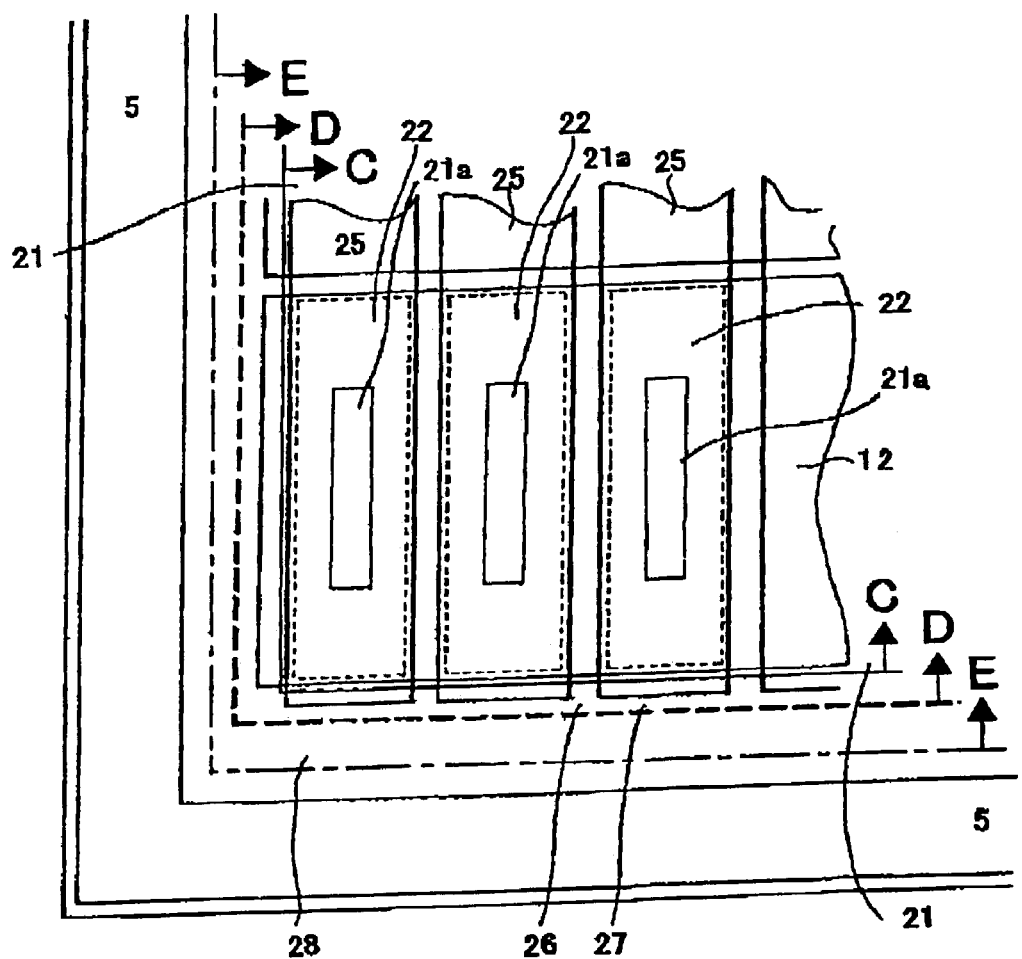
FIG. 2 illustrates a planar arrangement relationship of respective constructional elements when a dot part of the liquid crystal device as an embodiment of the present invention is enlarged.

FIG. 1A and FIG. 1B illustrate cross-sectional constructions of a liquid crystal display device as an embodiment of the present invention. FIG. 1A is a cross-sectional view of a liquid crystal display device provided with a liquid crystal panel 10 and a backlight 30, and FIG. 1B is a plan view of a lower substrate 2 (however, color filters 22, reflective layers 21 and a flattening film 23 are omitted). Further, FIG. 2 illustrates a planar arrangement relationship of respective constructional elements when a dot part of a liquid crystal device as an embodiment of the present invention is enlarged. Further, the present embodiment will be explained about the case where the present invention is applied to a passive matrix type liquid crystal display device. In the drawings referred to below, film thickness and dimension of respective constructional elements are changed appropriately to be suitable for easier reference to the drawings.

As shown in FIG. 1A, the liquid crystal panel 10 is constructed such that an upper substrate 1 and a lower substrate 2 are disposed opposite to each other, and a liquid crystal layer 4 is interposed between these substrates 1 and 2, and is sealed with a sealing material 5. Electrode layers 11 where a plurality of electrodes made of a transparent conductive material, such as an ITO, is arranged in stripe shape as seen in plan view, and an alignment film 12 which covers the electrode layers 11 is provided at the inner surface (liquid crystal layer side 4) of the upper substrate 1. A front diffusing plate 17, a retardation plate 18, and a polarizing plate 19 are laminated on the outer surface of the upper substrate 1.

Meanwhile, reflective layers 21 made of a metallic thin film with high reflectance, such as Al or Ag, a plurality of color filters 22 provided on the reflective layers, a light-transmitting flattening film 23 which covers the color filters 22, and electrode layers 25 formed on the flattening film 23, are provided at the inner surface (liquid crystal layer 4 side) of the lower substrate 2. The electrode layers 25 have a plurality of electrodes made of a transparent conductive material, such as an ITO, and arranged in stripe shape as seen in plan view. Also, as shown in FIG. 1B, a polarizing layer 26 covering the electrodes 25, and an insulating film 27 formed substantially at the same position as the polarizing layer 26 as seen in plan view, and an alignment film 28 covering the polarizing layer 26, and the insulating film 27 are further provided within a region surrounded with the sealing material 5.

Further, a polarizing plate 29 and a reflective polarizing plate 33 are on the outer surface of the lower substrate 2. Also, a reflective film 31 made of a metallic thin film with high reflectance, such as Al or Ag, is formed at the outer surface (opposite to the liquid crystal panel 10) of the backlight 30 which is provided at the back surface of the liquid crystal panel 30.

FIG. 2 illustrates a planar arrangement relationship of respective constructional elements shown in an enlarged dot part when the upper substrate 1 and the lower substrate 2 having the liquid crystal layer 4 interposed therebetween are adhered to each other with the sealing material 5. The electrodes 12 at the upper substrate 1 and the electrodes 25 on the lower substrate 2 intersect each other over a plane, and display dots are constructed at the intersected regions. The reflective layers 21 can be made of a metal material, such as an Al film or an Ag film (or silver alloy), and are patterned on the lower substrate 2 inwardly from a boundary indicated by "C" within a region surrounded with the sealing material 5. The reflective layers 21 are formed in a region including all the display dots constructed like above. Also, openings 21a penetrate the reflective layers 21 are correspondingly disposed within the respective dot regions. Further, the color filters 22 corresponding to the respective dots fill up the openings 21a, and an irregularity caused by the color filters 22 is flattened by a flattening film 23. Also, the electrodes 25 are formed in stripe shape, and the polarizing layer 26 is patterned on the flattening film 23 including the electrodes 25 inwardly from a boundary indicated by "D" within a region surrounded with the sealing material 5. Further, the insulating film 27 can be formed substantially at the same position as seen in plan view and the insulating film 27 has substantially the same shape as the polarizing layer 26 as seen in plan view. The insulating film 27 can be formed of an inorganic material mainly composed of $SiO_2$ or a resin material. If the insulating film 27 is formed of the inorganic material mainly composed of $SiO_2$, a dielectric constant of the film thickness is high. In this regard, it is preferable that the film thickness of the insulating film 27 be no less than 150 Å and no greater than 1500 Å. If the insulating film 27 is formed of the resin material, it has a lower dielectric constant than that of the inorganic material. For this reason, it is preferable that the film thickness of the insulating film 27 be no less than 150 Å and no greater than 1000 Å. Further, the alignment film 28 is patterned on the insulating film 27 inwardly from a boundary indicated by "E" within a region surrounded with the sealing material 5. The alignment film 28 covers the polarizing layer 26 and the insulating film 27 with a wider area than that of a plane region of the polarizing layer 26 and the insulating film 27 indicated by "D".

Further, at the outer surface of the lower substrate 2, a polarizing plate 29 and a reflective polarizing plate 33 having a transmission axis substantially parallel to that of the polarizing plate 29 are laminated sequentially from the lower substrate 2 so that the light emitted from the backlight 30 can be efficiently utilized for display. Specifically, among the light emitted from the backlight 30, a polarized component parallel to the transmission axis of the reflective polarizing plate 33 is transmitted through the reflective polarizing plate 33, and then is transmitted through the polarizing plate 29 having an axis substantially parallel to the transmission axis of the reflective polarizing plate 33 to enter the backside (lower substrate 2 side) of the reflective layers 21. At that time, the light, which has entered the openings 21a, enters the liquid crystal layer 4 as it is, to be utilized for display. However, the light, which has entered any region other than the openings 21a, is reflected by the reflective layers 21 and is returned to the polarizing plate 29. Also, the light parallel to the transmission axes of the polarizing plate 29 and the reflective polarizing plate 33 is transmitted through the polarizing plate 29 and the reflective polarizing plate 33, is returned to the backlight 30, is reflected by the reflective film 31 provided at the outer surface of the backlight 30, and is again utilized as the light redirected toward the liquid crystal panel 10.

Meanwhile, the light, which is not transmitted through the reflective polarizing plate 33 after it is emitted from the backlight 30, is reflected by the reflective polarizing plate 33, enters the backlight 30 and is reflected by the reflective film 31 of the backlight 30. Accordingly, the light reflected by the reflective polarizing plate 33 repeats the reflection between the reflective polarizing plate 33 and the reflective film 31. Also, during the repetition of such reflection, the polarized direction of light is gradually varied, so that a part of the light can be transmitted through the reflective polarizing plate 33. In this regard, the light reflected by the reflective polarizing plate 33 can be utilized for display.

As described above, in the liquid crystal display device according to the present embodiment, since almost all of the light emitted from the backlight 30 is utilized as a light source for transmissive display of the liquid crystal panel 10, it is possible to obtain bright display even in the transmission mode.

As shown in FIG. 1B and FIG. 2, in the liquid crystal display device constructed as mentioned above, the polarizing layer 26 is arranged inside the sealing material 5, and the polarizing layer 26 constructed by lyotropic liquid crystal as a water-soluble dichroic dye is covered with the insulating film 27 and the alignment film 28. In this regard, the polarizing layer 26 cannot be deteriorated by moisture contained in the ambient air, and the like, and it is possible to provide a liquid crystal display device having excellent reliability. In FIG. 1B, the polarizing layer 26 is patterned in the same shape as the insulating film within a region surrounded with the sealing material 5. The alignment film 28 is constructed to cover the polarizing layer 26 and the insulating film 27 with a wider area than that of a region formed by the polarizing layer 26 and the insulating film 27.

Further, the polarizing layer 26 is formed on the electrode layers 25 which are formed on the surface flattened by the flattening film 23 so that the polarizing layer 26 is flatly formed on the electrode layers 25. Due to such formation, it is not possible for any disorder to occur in the alignment of lyotrophic liquid crystal constructing the polarizing layer 26, and good polarization characteristics can be obtained. As described above, the liquid crystal display device of the present embodiment has the aforementioned construction, so that excellent reliability and display quality can be obtained.

Figure 3:
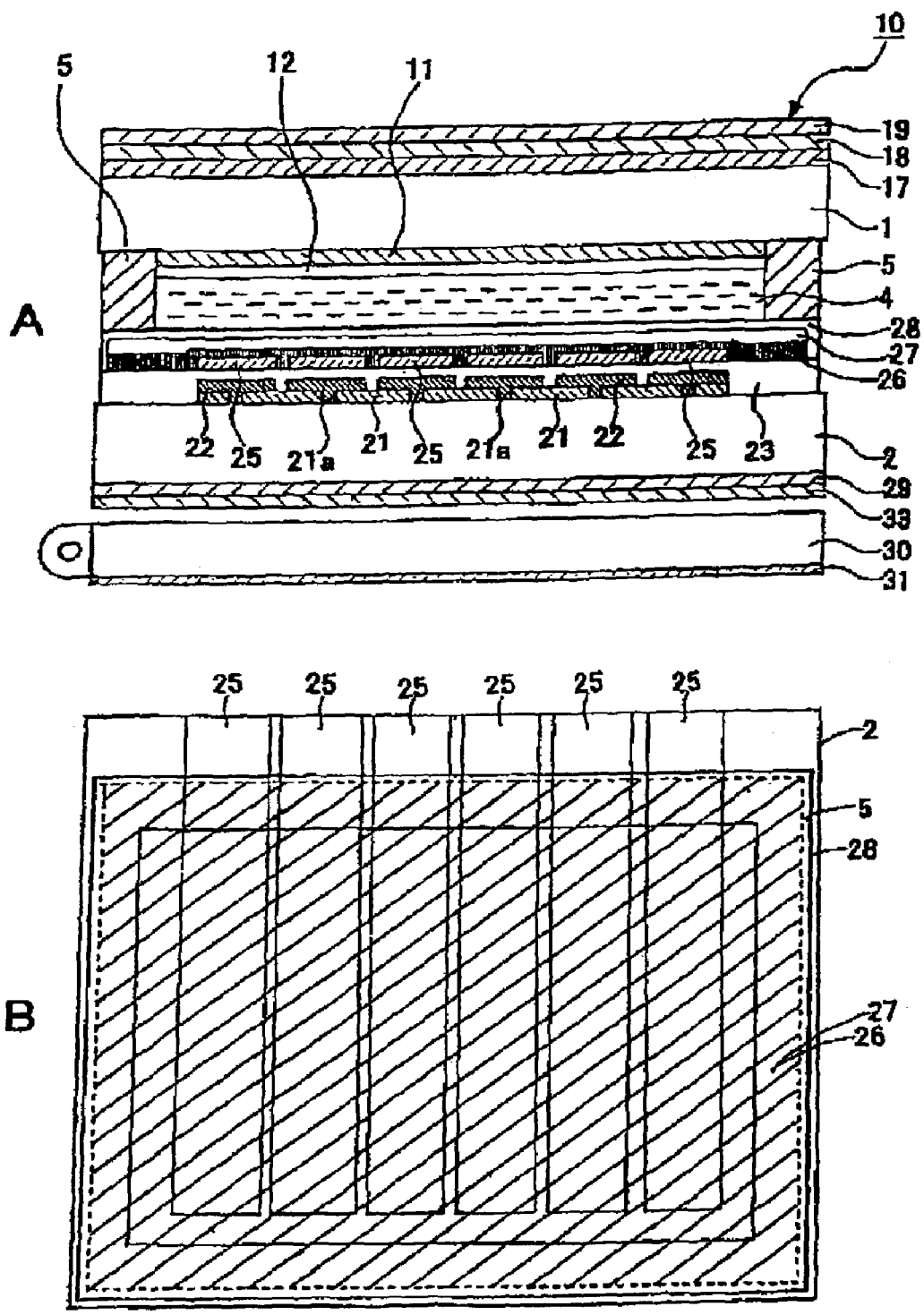
FIG. 3 is cross-sectional constructional views of a liquid crystal display device as another embodiment of the present invention.

Moreover, FIG. 3A and FIG. 3B illustrate cross-sectional constructions of a liquid crystal display device as another embodiment of the present invention. FIG. 1A is a cross-sectional view of a liquid crystal display device provided with a liquid crystal panel 10 and a backlight 30, and FIG. 2B is a plan view of a lower substrate 2 (however, color filters 22, reflective layers 21 and a flatting film 23 are omitted). Further, in the description of the present embodiment, the constructional elements common to those of the embodiment described above will be described with the same reference numerals. In the drawings referred herein below, film thickness and dimension of respective constructional elements are changed appropriately to be suitable for easier reference to the drawings.

In the embodiment described above, it has been described a case wherein the outer end of the polarizing plate 26 is positioned at further inner side than the inner peripheral end of the sealing material 5. However, a liquid crystal display device according to another embodiment of the present embodiment, as shown in FIG. 3A and FIG. 3B, is constructed such that the outer end of the polarizing layer 26 is positioned at least at further inner side than the outer peripheral end of the sealing material 5.

When observing the above construction in a plane view as shown in FIG. 3B, the polarizing layer 26 and the insulating film 27 partially overlap a region where the sealing material 5 is disposed. Moreover, the insulating film 27 and the alignment film 28 can be constructed to cover the polarizing layer 26 made of lyotropic liquid crystal as a water-soluble dichroic dye. In this regard, it is possible to provide a liquid crystal display device having excellent reliability without deteriorating the polarizing layer 26 due to moisture contained in the ambient air, and the like. Also, the polarizing layer 26 and the insulating film are patterned in the same shape, and the alignment film 28 is constructed to cover the polarizing layer 26 and the insulating film 27 with a wider area than that of a region formed by the polarizing layer 26 and the insulating film 27. In FIG. 3B, the boundary of a formation region of the alignment film 28 coincides with the outer peripheral portion of the sealing material 5. However, the alignment film 28 may be formed more widely in terms of area so as to extend over the outer peripheral portion of the sealing material 5. Also, the embodiment of the present construction enables acquisition of the above-mentioned effects.

Further, although the present embodiment has been described in relation to the transflective liquid crystal display device, the present invention is not limited to such construction, but the display type of the liquid crystal display device may be a transmission type or a reflection type.

Figure 4:
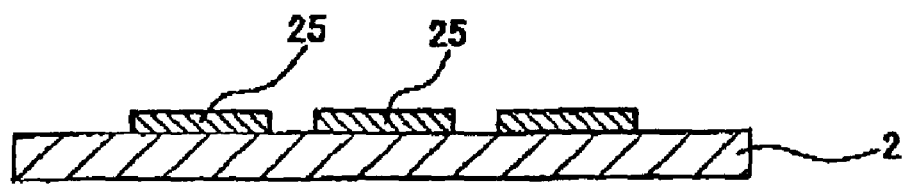
FIGS. 4A–4E is a cross-sectional flow diagram illustrating a manufacturing method of a liquid crystal display device as an embodiment of the present invention.
Figure 4:
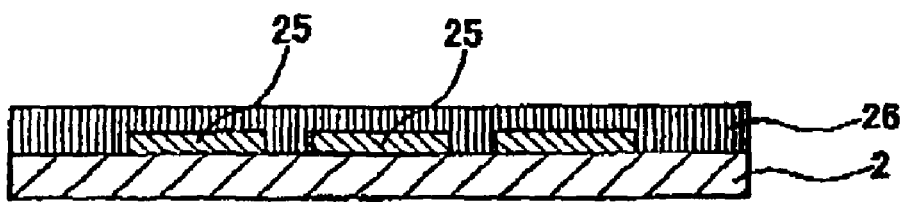
Figure 4:
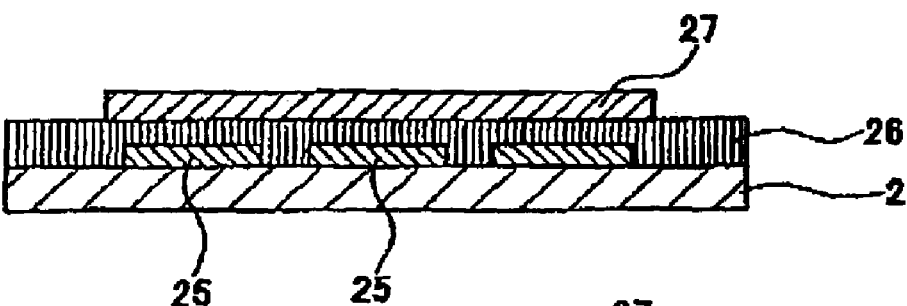
Figure 4:
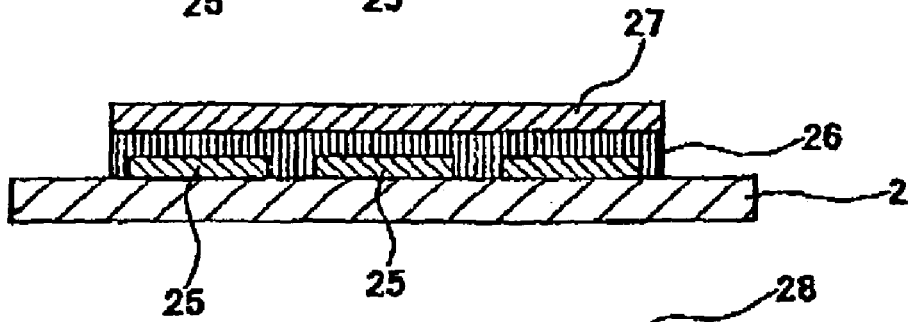
Figure 4:
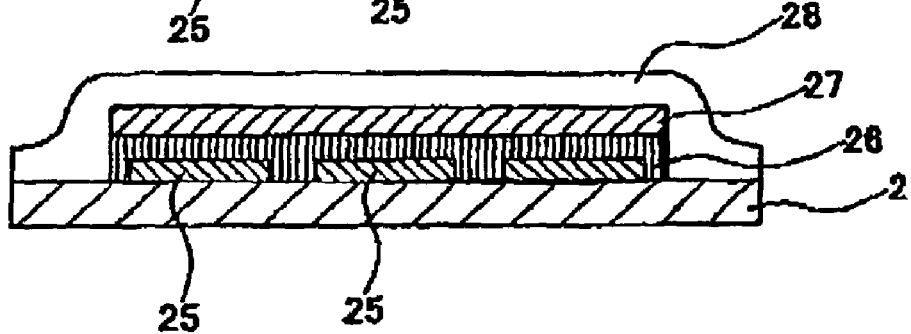

FIG. 4 is a cross-sectional flow diagram illustrating an embodiment of an exemplary manufacturing method according to the present invention. The flow diagram shown in FIG. 4 illustrates only a method for manufacturing a lower substrate of the liquid crystal display device which is a characteristic of the manufacturing method according to the present invention.

When a liquid crystal display device is manufactured by the manufacturing method of the present embodiment as shown in FIG. 4A, first, a lower substrate 2 made of a transparent glass or resin, and the like, is prepared, and electrode layers 25 are formed on the lower substrate 2. Further, although reflective layers, color filters or a flattening film are actually formed between the electrode layers 25 and the lower substrate 2 as shown in FIG. 1A, the illustration thereof is omitted in FIG. 4.

Next, when the electrode layers 25 have been formed, as shown in FIG. 4B, a lyotropic liquid crystal solution is coated by applying pressure in a predetermined direction so as to cover the electrode layers 25. Thereafter, the solution is solidified to form a polarizing layer 26.

Next, as shown in FIG. 4C, an insulating film 27 is partially formed on the polarizing layer 26. The insulating film can be formed of, for example, acryl group resin, and the like. The insulating film can be partially formed so as to be easily illustrated by the patterning using a photolithographic method. Further, for example, an organic solvent containing $SiO_2$ is formed by relief printing, thereby allows easier patterning.

Next, the lower substrate 2 on which the insulating film 27 has been formed is cleaned with water from the insulating film 27 side, thereby partially removes a region of the polarizing layer 26 in which the insulating film 27 is not formed. The polarizing layer 26 is water-soluble, and can be very easily removed when cleaned with water. As shown in FIG. 4D, in the present embodiment in which a part of the polarizing layer removes, a region of the polarizing layer 26 where the sealing material 5 is to be provided on the lower substrate 2 is partially removed, and the polarizing layer 26 is arranged inside the sealing material 5.

When the patterning of the polarizing layer 26 is completed in such a manner, as shown in FIG. 4E, an alignment film 28 is formed to cover the insulating film 27 and the polarizing layer 26. The alignment film 28 is formed in such a manner to protect the polarizing layer 26, so that it is possible to manufacture a liquid crystal display device which will hardly deteriorate the polarizing layer 26 but have excellent reliability. Further, the insulating film 27 for protecting the polarizing layer 26 is utilized for masking to selectively dispose the polarizing layer 26, so that it is possible to realize a simplified process and reduction of the manufacturing cost.

Undoubtedly, to the manufacturing steps of the liquid crystal display device except for steps of forming respective layers on the lower substrate 2 as shown in FIG. 4 are applicable the manufacturing steps of a liquid crystal display device that have been conventionally utilized.

Now, examples of electronic apparatuses including the liquid crystal display device of the above embodiments will be described.

Figure 5:
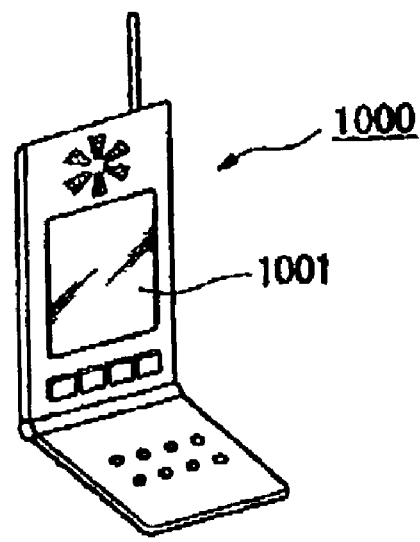
FIGS. 5A to 5C are perspective views illustrating several examples of electronic apparatuses according to the present invention.
Figure 5:
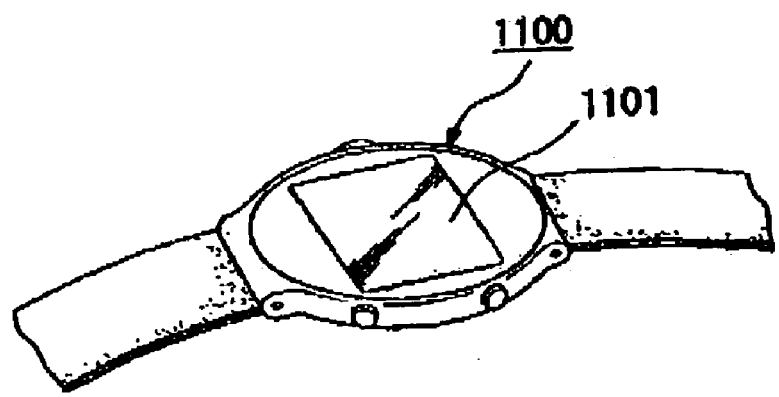
Figure 5:
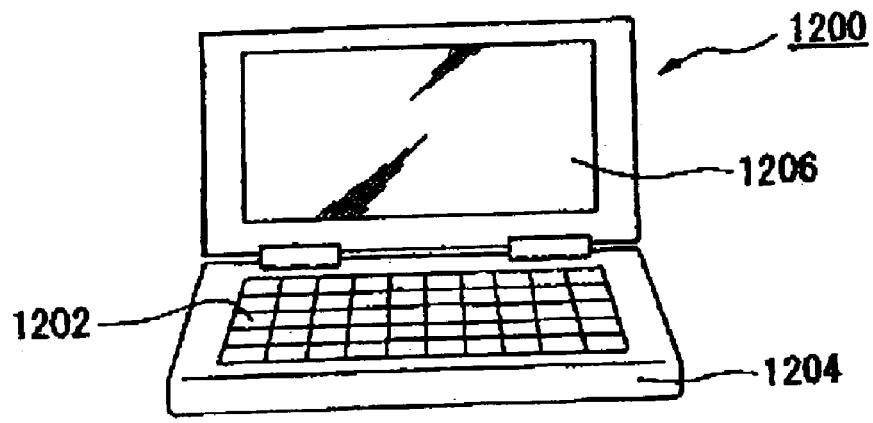

FIG. 5A is a perspective view illustrating an example of a mobile phone. In FIG. 5A, reference numeral 1000 denotes a main body of the mobile phone, and reference numeral 1001 denotes a display part using the above liquid crystal display device.

FIG. 5B is a perspective view illustrating an example of a wristwatch-type electronic apparatus. In FIG. 5B, reference numeral 1100 denotes a main body of the watch. Reference numeral 1101 denotes a display part using the above liquid crystal display device.

FIG. 5C is a perspective view illustrating an example of a portable information processing apparatus such as a word processor or a personal computer. In FIG. 5C, reference numeral 1200 denotes an information processing apparatus, reference numeral 1202 denotes an input part, such as a keyboard, reference numeral 1204 denotes a main body of the information processing apparatus, and reference numeral 1206 denotes a display part using the above liquid crystal display device.

The electronic apparatuses shown in FIG. 5A to FIG. 5C include liquid crystal display parts using a liquid crystal display device according to the above embodiments. As a result, it is possible to obtain bright display in a transmission mode, and to realize an electronic apparatus having a display part with excellent reliability.

As described above in detail, the liquid crystal display device according to the present invention can be constructed such that the polarizing layer is formed above electrode layers provided on the inner surface of the lower substrate; and the polarizing layer on the lower substrate is formed further towards the inside than the outer peripheral end of a sealing material for sealing the liquid crystal layer between the upper and lower substrates. As a result, since the polarizing layer is isolated from the ambient air by the sealing material, the deterioration of the polarizing layer due to moisture in the ambient air is prevented. Hence, it is possible to provide a liquid crystal display device having excellent reliability.

Additionally, the present invention provides a method for manufacturing a liquid crystal display device including forming a polarizing layer on reflective layers, partially forming an insulating film on the polarizing layer, and partially removing the polarizing layer by using the insulating film as a mask. Therefore, the method for manufacturing a liquid crystal display device in which the liquid crystal display device in which the polarizing layer is partially formed on the reflective layers and the insulating film is formed right on the polarizing layer can be easily manufactured can be provided. The liquid crystal display device manufactured by such a method includes an insulating film on a polarizing layer, and the polarizing layer is formed substantially in the same shape as the insulating film as seen in plan view. Accordingly, the insulating film protects the upper surface side of the polarizing layer, so that the polarizing layer hardly deteriorates but has excellent reliability.

The invention claimed is:

1. A liquid crystal display device, comprising: an upper substrate and a lower substrate positioned opposite to each other;
    a liquid crystal layer disposed between the upper substrate and the lower substrate;
    electrode layer provided on an inner surface of the lower substrate;
    a sealing material that seals the liquid crystal layer between the upper and lower substrates; and
    a polarizing layer formed in between the liquid crystal and the electrode layer, the entire polarizing layer being formed further towards the inside than an inner peripheral end of the sealing material.

2. The liquid crystal display device according to claim 1, reflective layers partially formed in respective dots being provided on the lower substrate rather than on the polarizing layer on the lower substrate.

3. The liquid crystal display device according to claim 1, an insulating film being formed on the polarizing layer.

4. The liquid crystal display device according to claim 3, the insulating film being made of a material mainly composed of $SiO_2$.

5. The liquid crystal display device according to claim 4, a thickness of the insulating film being no less than 150 Å and no greater than 1500 Å.

6. The liquid crystal display device according to claim 3, the insulating film being made of a light-transmitting resin material.

7. The liquid crystal display device according to claim 6, the thickness of the insulating film being no less than 150 Å and no greater than 1000 Å.

8. The liquid crystal display device according to claim 3, an alignment film being formed on the insulating film, and a thickness of the alignment film being no less than 100 Å and no greater than 800 Å.

9. The liquid crystal display device according to claim 3, the outer peripheral end of the polarizing layer and an outer peripheral end of the insulating film being substantially at a same position as seen in plan view, and the alignment film being formed to cover the polarizing layer and the insulating film.

10. A liquid crystal display device according to claim 1, further comprising an alignment film disposed between the other polarizing layer and the sealing material to separate the other polarizing layer from the sealing material.

* * * * *